(12) United States Patent
Sherman

(10) Patent No.: US 7,574,549 B2
(45) Date of Patent: Aug. 11, 2009

(54) BRIDGE DESIGN FOR SD AND MMC MULTIPLEXING

(75) Inventor: Itay Sherman, Hod Hasharon (IL)

(73) Assignee: Modu Ltd., Kfar Saba (IL)

( * ) Notice: Subject to any disclaimer, the term of this patent is extended or adjusted under 35 U.S.C. 154(b) by 61 days.

(21) Appl. No.: 12/008,501

(22) Filed: Jan. 11, 2008

(65) Prior Publication Data

US 2009/0179668 A1 Jul. 16, 2009

(51) Int. Cl.
*G06F 13/36* (2006.01)
*H03K 19/0175* (2006.01)

(52) U.S. Cl. .................. 710/306; 710/305; 710/312; 326/86; 326/38

(58) Field of Classification Search ............. 326/38–41, 326/86, 113; 710/305–306, 312
See application file for complete search history.

(56) References Cited

U.S. PATENT DOCUMENTS

| | | | |
|---|---|---|---|
| 5,628,055 A | 5/1997 | Stein | |
| 5,790,526 A * | 8/1998 | Kniess et al. | 370/257 |
| 6,201,867 B1 | 3/2001 | Koike | |
| 6,243,578 B1 | 6/2001 | Koike | |
| 6,516,202 B1 | 2/2003 | Hawkins et al. | |
| 6,617,871 B2 * | 9/2003 | Stark | 324/765 |
| 6,690,947 B1 | 2/2004 | Tom | |
| 6,806,737 B2 * | 10/2004 | Sung et al. | 326/98 |
| 6,898,283 B2 | 5/2005 | Wycherley et al. | |
| 6,900,664 B2 * | 5/2005 | Wu | 326/86 |
| 6,999,792 B2 | 2/2006 | Warren | |
| 7,085,542 B2 | 8/2006 | Dietrich et al. | |
| 7,194,285 B2 | 3/2007 | Tom | |
| 7,266,391 B2 | 9/2007 | Warren | |
| 7,266,463 B2 * | 9/2007 | Dixon et al. | 702/64 |
| 7,512,671 B1 * | 3/2009 | Gladwin et al. | 709/219 |
| 2004/0233930 A1 | 11/2004 | Colby, Jr. | |
| 2005/0070225 A1 | 3/2005 | Lee | |
| 2005/0159184 A1 | 7/2005 | Kerner et al. | |
| 2006/0105722 A1 | 5/2006 | Kumar | |
| 2006/0241353 A1 | 10/2006 | Makino et al. | |
| 2007/0004450 A1 | 1/2007 | Parikh | |
| 2007/0018957 A1 | 1/2007 | Seo | |

(Continued)

FOREIGN PATENT DOCUMENTS

| | | |
|---|---|---|
| EP | 1871075 A1 | 12/2007 |
| WO | 0059247 A1 | 10/2000 |
| WO | 0186922 A1 | 11/2001 |
| WO | 03103174 A1 | 12/2003 |

*Primary Examiner*—Vibol Tan
(74) *Attorney, Agent, or Firm*—Soquel Group LLC

(57) ABSTRACT

A method for determining direction of signal transmission in a bi-directional signal line, including sampling data signals at two terminals, A and B, enabling data flow from A to B when data flow from B to A is not enabled, and a logical 0 bit is sampled at A, enabling data flow from B to A when data flow from A to B is not enabled, and a logical 0 bit is sampled at B, disabling data flow from A to B when data flow from A to B is enabled and two successive logical 1 bits are sampled at A, and disabling data flow from B to A when data flow from B to A is enabled and two successive logical 1 bits are sampled at B. An electrical circuit is also described and claimed.

11 Claims, 4 Drawing Sheets

U.S. PATENT DOCUMENTS

2007/0161404 A1    7/2007  Yasujima et al.
2007/0266182 A1*  11/2007  Lanning ........................ 710/1
2007/0266183 A1*  11/2007  Lanning ........................ 710/1
2008/0026794 A1    1/2008  Warren
2008/0140886 A1    6/2008  Izutsu

* cited by examiner

| Sample A and B Signals for SSD/MMC Bridge Logic | | | | | | | | | | | | | | | | | | | | | | | | | |
|---|---|---|---|---|---|---|---|---|---|---|---|---|---|---|---|---|---|---|---|---|---|---|---|---|---|
| A | 1 | 1 | 0 | 0 | 1 | 0 | 1 | 0 | 1 | 0 | 1 | 1 | 1 | 0 | 1 | 1 | 1 | 1 | 1 | x | x | x | x | x | x |
| Logic A (DFF EnAB.in) | 0 | 0 | 0 | 1 | 1 | 1 | 1 | 1 | 1 | 1 | 1 | 0 | 0 | 1 | 0 | 0 | 0 | 0 | 0 | 0 | 0 | 0 | 0 | 1 | 0 |
| DFF EnAB.out | 0 | 0 | 0 | 1 | 1 | 1 | 1 | 1 | 1 | 1 | 1 | 1 | 0 | 0 | 1 | 0 | 0 | 0 | 0 | 0 | 0 | 0 | 0 | 1 | 0 |
| Out A (BufferAtoB.out) | x | x | x | 0 | 0 | 1 | 1 | 1 | 1 | 1 | 1 | 1 | 0 | 0 | x | x | x | x | x | x | x | x | x | x | x |
| B | x | x | x | x | x | x | x | x | x | x | x | x | 1 | 0 | 1 | 0 | 0 | 1 | 1 | 0 | 1 | 1 | 0 | 1 | 1 |
| Logic B (DFF EnBA.in) | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 0 |
| DFF EnBA.out | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |
| Out B (BufferBtoA.out) | x | x | x | x | x | x | x | x | x | x | x | x | x | x | 0 | 0 | 1 | 0 | 0 | 1 | 1 | 1 | 0 | 1 | x |

FIG. 3

BRIDGE DESIGN FOR SD AND MMC MULTIPLEXING

FIELD OF THE INVENTION

The field of the present invention is bi-directional electrical data signal lines.

BACKGROUND OF THE INVENTION

The SD card and multi-media card (MMC) standards use bi-directional bus lines. Specifically, the four data lines D0-D3 and the CMD lines are bi-directional, and the CLK line for a clock is uni-directional.

Conventionally, signal direction cannot be resolved by monitoring a simple condition. Instead, signal direction is determined by content of bus transactions; i.e., content of messages transferred over a bus.

The SD card and MMC standards also define voltage levels for signals. An SD card, for example, should operate in the 2.7V -3.6V range.

Some advanced silicon processes do not support voltages higher than 1.8V. For such processes, support of SD and MMC requires use of external level shifters, which boost voltages at a terminal. For a bi-directional bus connecting terminals A and B, a level shifter drives terminal A to 3V when terminal B is at 1.8V, for enabling a data signal to travel from A to B. Similarly, a level shifter drives terminal B to 3V when terminal A is at 1.8V, for enabling a data signal to travel from B to A. Thus level shifters require knowledge of signal direction in order to operate properly.

Conventional implementations of level shifting include an additional pin for each bus signal, to determine signal direction. Such an implementation is present in the Level Translator, Model SN74AVCA406 SMC/xD, manufactured and distributed by Texas Instruments, Inc. of Dallas, Tex. Integrated circuits that interface with such level shifters must support directional signals, in addition to the standard SD and MMC signals.

Support of directional signals causes large overhead and cost, for both the level shifter and the integrated circuit that interfaces with it. This is one of the drawbacks of bi-directional data buses.

Devices that require bridges between SD devices, such as a bridge between an SD host and an SD slave, also encounter the problem of determining signal direction. Moreover, often the SD signals being bridged to not have directional signals associated therewith, and thus their direction is unknown.

It would thus be of advantage to have circuitry and logic for determining signal direction in a bi-directional SD or MMC bus, without requiring external direction signals and without requiring decoding of exact content of bus transactions.

SUMMARY OF THE DESCRIPTION

Aspects of the present invention relate to circuitry for bi-directional SD and MMC buses, which overcomes drawbacks of conventional circuitry by determining bus direction without use of external directions signals, and without decoding exact content of bus transactions.

In one embodiment, the present invention employs two data buffers, a first buffer that drives signals in a data bus in a direction from a terminal A to a terminal B, and a second buffer that drives signals in the opposite direction. The buffers may be in an enabled or disabled state. When a buffer is enabled, it drives the signal direction.

Special logic is introduced to determine when to enable and disable each of the buffers, based on logical processing of sampled bits at terminals A and B.

There is thus provided in accordance with an embodiment of the present invention a method for determining direction of signal transmission in a bi-directional signal line, including sampling data signals at two terminals, A and B, enabling data flow from A to B when data flow from B to A is not enabled, and a logical 0 bit is sampled at A, enabling data flow from B to A when data flow from A to B is not enabled, and a logical 0 bit is sampled at B, disabling data flow from A to B when data flow from A to B is enabled and two successive logical 1 bits are sampled at A, and disabling data flow from B to A when data flow from B to A is enabled and two successive logical 1 bits are sampled at B.

There is further provided in accordance with an embodiment of the present invention an electrical circuit with bi-directional signal transmission, including a bi-directional data bus for connecting two terminals, A and B, a first signal sampler for sequentially sampling a signal at terminal A, a second signal sampler for sequentially sampling a signal at terminal B, a first level shifter for driving signals on the data bus from A to B, which may be enabled or disabled, a second level shifter for driving signals on the data bus from B to A, which may be enabled or disabled, and circuitry for enabling and disabling the first and second level shifters by carrying out instructions to enable the first level shifter when the second level shifter is not enabled, and a logical 0 bit is sampled by the first signal sampler, enable the second level shifter when the first level shifter is not enabled, and a logical 0 bit is sampled by the second signal sampler, disable the first level shifter when the first level shifter is enabled and two successive logical 1 bits are sampled by the first signal sampler, and disable the second level shifter when the second level shifter is enabled and two successive logical 1 bits are sampled by the second signal sampler.

There is yet further provided in accordance with an embodiment of the present invention an electrical circuit with bi-directional signal transmission, including a bi-directional data bus for connecting a terminal, A, with two terminals, B and C, a controller for selectively connecting terminal A with terminal B or with terminal C, a first signal sampler for sequentially sampling a signal at terminal A, a second signal sampler for sequentially sampling a signal at terminal B, a third signal sampler for sequentially sampling a signal at terminal C, a first level shifter for driving signals on the data bus from A to B, which may be enabled or disabled, a second level shifter for driving signals on the data bus from B to A, which may be enabled or disabled, a third level shifter for driving signals on the data bus from A to C, which may be enabled or disabled, a fourth level shifter for driving signals on the data bus from C to A, which may be enabled or disabled, and circuitry for enabling and disabling the first, second, third and fourth level shifters by carrying out instructions to enable the first level shifter when (i) the controller selects terminal B, (ii) the second level shifter is not enabled, and (iii) a logical 0 bit is sampled by the first signal sampler, enable the second level shifter when (i) the controller selects terminal B, (ii) the first level shifter is not enabled, and (iii) a logical 0 bit is sampled by the second signal sampler, enable the third level shifter when (i) the controller selects terminal C, (ii) the fourth level shifter is not enabled, and (iii) a logical 0 bit is sampled by the third signal sampler, enable the fourth level shifter when (i) the controller selects terminal C, (ii) the third level shifter is not enabled, and (iii) a logical 0 bit is sampled by the fourth signal sampler, disable the first level shifter when the first level shifter is enabled and two successive logical 1 bits are sampled by the first signal sampler, disable the second level shifter when the second level shifter is enabled and two successive logical 1 bits are sampled by the second signal sampler, disable the third level shifter when the third level shifter is enabled and two successive logical 1 bits are sampled by the third signal sampler, and disable the fourth level shifter when the fourth level shifter is enabled and two successive logical 1 bits are sampled by the fourth signal sampler.

BRIEF DESCRIPTION OF THE DRAWINGS

The present invention will be more fully understood and appreciated from the following detailed description, taken in conjunction with the drawings in which:

FIG. 3 is a sample simulation of the method of FIG. 2, in accordance with an embodiment of the present invention.

DETAILED DESCRIPTION

Aspects of the present invention relate to a bi-directional data bus that connects a terminal A with a terminal B. The data bus may be an SD or MMC bridge, wherein terminal A is generally connected to a host device and terminal B is connected to a slave device. Unlike conventional SD and MMC bridges, the bridges of the present invention are capable of determining signal direction without the need for external directional signals, and without the need for decoding exact content of messages being transmitted over the bridge.

Figure 1:
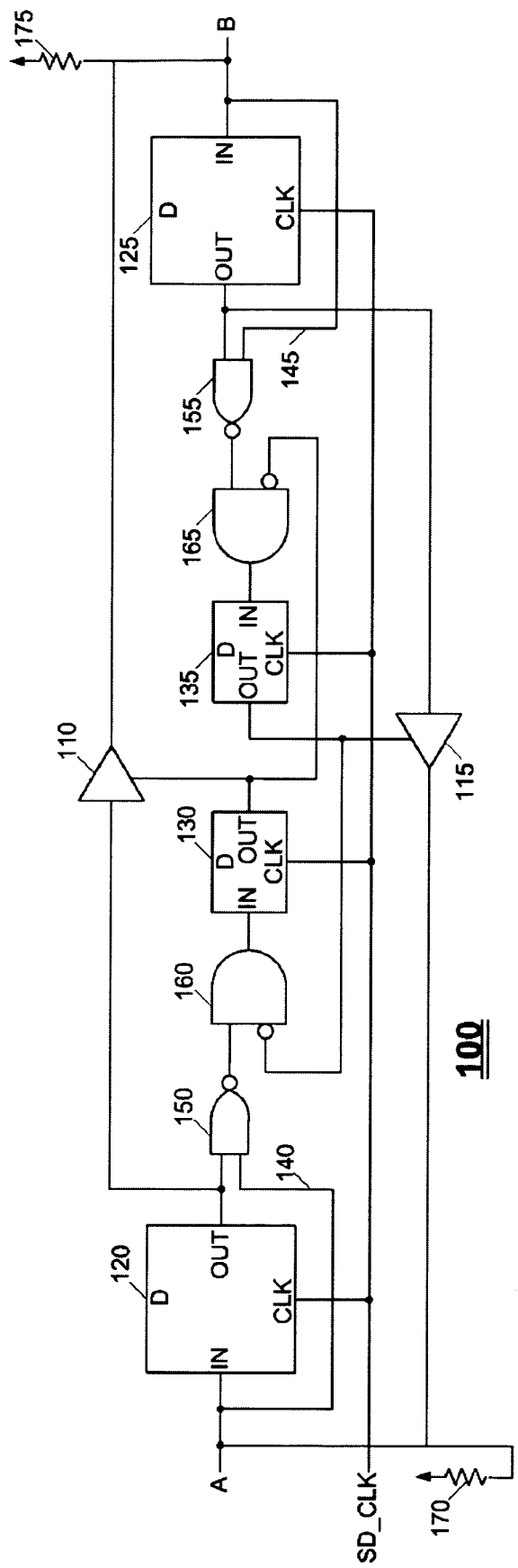
FIG. 1 is a simplified diagram of an electrical circuit that determines bus direction in bi-directional SD and MMC signal lines, in accordance with an embodiment of the present invention.

Reference is now made to FIG. 1, which is a simplified diagram of an electrical circuit 100 that determines bus direction in bi-directional SD and MMC signal lines, in accordance with an embodiment of the present invention. Circuit 100 connects two terminals, A and B, and carries signals in both directions; i.e., from A to B, and from B to A.

Generally, one terminal connects to an SD host and the other terminal connects to an SD slave. In such case, there are multiple bi-directional data lines D0-D3 and CMD. The data lines D0-D3 are synchronized so that they change their signal directions simultaneously.

The voltages at terminals A and B may be the same, or may be different. To accommodate different voltages at the terminals, circuit 100 includes two level-shifter buffers, 110 and 115, which drive signals from A to B and from B to A, respectively. Level shifting generates voltage drops across the buffers in order to drive the signal direction. Each buffer has two states; namely, enabled and disabled. When buffer 110 is enabled, signal data is transmitted from A to B, and when buffer 115 is enabled, signal data is transmitted from B to A.

Circuit 100 also includes four data flip flop (DFF) modules; namely, module 120 designated DFF_A, module 125 designated DFF_B, module 130 designated DFF_EnAB, and module 135 designated DFF_EnBA. Each DFF module has an input value, an output value and a clock value. The output of a DFF module delays the input by one clock count; i.e., a DFF module captures the input signal at the moment of a rising clock edge, when the clock goes high, and subsequent input changes to not influence the output until the next rising clock edge.

Modules 130 and 135 are used to enable buffers 110 and 115, respectively. Specifically, when DFF_EnAB.out=0, buffer 110 is enabled, and when DFF_EnAB.out=1, buffer 110 is disabled. Similarly, when DFF_EnBA.out=0, buffer 115 is enabled, and when DFF_EnBA.out=1, buffer 115 is disabled.

Circuit 100 also includes respective by-pass lines 140 and 145, so that previous signal values A and B, denoted A_Delayed and B_Delayed, respectively, are accessible, together with current signal values A and B.

Circuit 100 includes four logical processing units, 150, 155, 160 and 165. Processing unit 150 has inputs A and A_Delayed; processing unit 155 has inputs B and B_Delayed; processing unit 160 has input DFF_EnBA.out in addition to the data coming from processing unit 150 into processing unit 160; and processing unit 165 has input DFF_EnAB.out in addition to the data coming from processing unit 155 into processing unit 165. Operation of processing units 150, 155, 160 and 165 is described in the discussion of FIG. 2 hereinbelow.

Circuit 100 includes two pull-up resistors, 170 and 175, pull the circuit bus up to logical 1 when both sides of the SD or MMC link are not driving signals.

Figure 2:
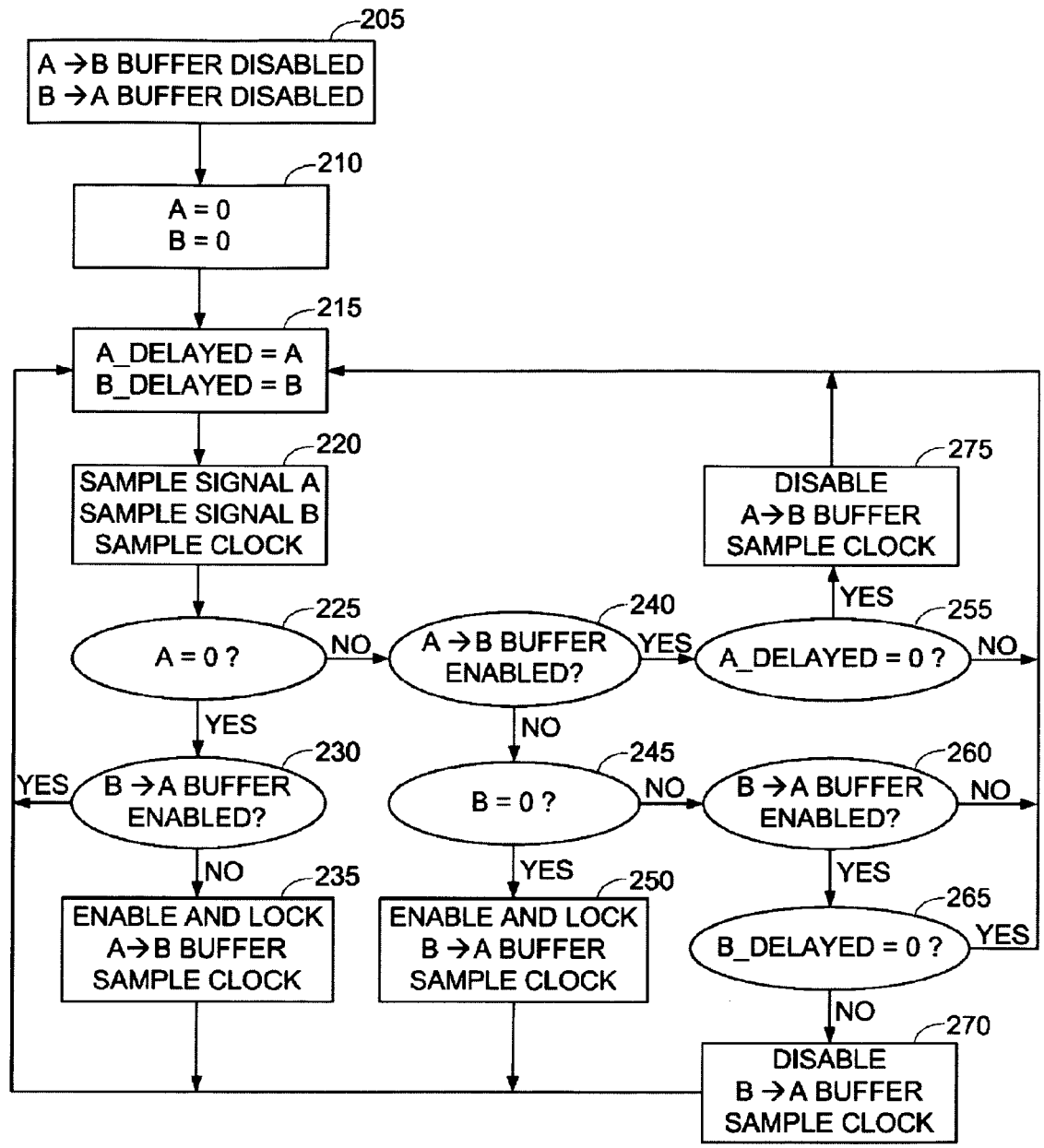
FIG. 2 is a simplified flowchart of a method for determining bus direction in bi-directional SD and MMC signal lines, in accordance with an embodiment of the present invention.

Reference is now made to FIG. 2, which is a simplified flowchart of a method for determining bus direction in bi-directional SD and MMC signal lines, in accordance with an embodiment of the present invention. Specifically, FIG. 2 summarizes a portion of the logic for enabling and disabling buffers 110 and 115 of FIG. 1.

The rationale for the logic illustrated in FIG. 2 is based on three characteristics of SD and MMC buses; namely:

1. The SD and MMC bus D0-D3 and CMD lines have pull-up resistors 170 and 175 connected thereto, which pull the bus up to logical 1 when both sides of the SD or MMC link are not driving signals.
2. Each SD and MMC transaction on the D0-D3 and CMD lines begins with a start bit of logical 0 and ends with a stop bit of logical 1.
3. Since the SD and MMC buses include direction transition, the side driving a signal stops driving a bus 2 clock cycles before the opposite side starts driving the bus.

The logic of FIG. 2 begins at step 205 where both buffers are set to their disabled states. At step 210 the A and B signal values are initialized to logical 0. Steps 215 and 220 are iterative steps that save previous A and B signal values and sample new values.

As seen at steps 225-250, when one side of circuit 100, A or B, is sampled to have a logical 0 input, circuit 100 enables the buffer in the direction from that side to the opposite side, and locks the buffer in the enabled state.

As seen at steps 255-275, circuit 100 disables the enabled buffer when two consecutive logical 1 bits are detected. The event of detecting two consecutive logical 1 bits may represent an end of transaction, or may be part of a transaction. In the former case, both buffers are disabled, and circuit 100 is ready to detect a next transaction, and switch direction as required. In the latter case, the SD or MMC bus remains in its correct logical level due to the pull-up resistors. Since the previous bit was a logical 1, no delay in bus signal stabilization is incurred, due to device and bus capacitance.

In order to avoid potential problems with transient conditions and synchronization to the SD_CLK signal, an embodiment of the present invention includes a sampling mechanism that delays transfer of bits from one direction to the other direction by a single clock, as indicated at steps 220, 235, 250, 270 and 275 of FIG. 2. Such delays are implemented by DFF modules 120, 125, 130 and 135 of FIG. 1, and do not affect proper operation of the SD or MMC bus, since transaction starts are determined by start bits, and not based on exact timing. Internally in a transaction, the delay is fixed and thus no change to transaction content occurs.

Reference is now made to the Verilog pseudo-code presented herein, which summarizes one cycle of the logic for enabling and disabling buffers 110 and 115 of FIG. 1. Logical processing units 150 and 160 are used to evaluate the Boolean expression !(A & A_Delayed) &!DFF_EnBA.out, and logical processing units 155 and 165 are used to evaluate the Boolean expression !(B & B_Delayed) &!DFF_EnAB.out.

```
DFF_A.in = A
DFF_A.clk = SD_CLK
A_Delayed = DFF_A.out
DFF_B.in = B
DFF_B.clk = SD_CLK
B_Delayed = DFF_B.out
BufferAtoB.in = A_Delayed
B = BufferAtoB.out
BufferBtoA.in = B_Delayed
A = BufferBtoA.out
DFF_EnAB.in = ! (A & A_Delayed) &!DFF_EnBA.out
DFF_EnAB.clk = SD_CLK
BufferAtoB.enable = DFF_EnAB.out
DFF_EnBA.in = ! (B & B_Delayed) &!DFF_EnAB.out
DFF_EnBA.clk = SD_CLK
BufferBtoA.enable = DFF_EnBA.out
```

The logic of FIG. 2 applies to all bi-directional signals in an SD or MMC bus. However, since the D0-D3 data lines change direction simultaneously, it is only necessary to apply the logic of FIG. 2 to one of these data lines. The buffer enable/disable signals derived for the one data line suffices to control the buffers for the other three data lines.

Reference is now made to FIG. 3, which is a sample simulation of the Verilog code for A and B signals 110010101110111 and 0010111, respectively, in accordance with an embodiment of the present invention. Each column in FIG. 3 represents one clock cycle. As may be seen in FIG. 3, the signal direction goes from A to B, and Out A is a one clock delay of A, for bits 0010101 and for bits 01. During the time Out A is used, the buffer from A to B is locked (represented by logical 1), and the buffer from B to A is unlocked (represented by logical 0). Signal direction goes from B to A, and Out B is a one clock delay of B, for bits 00101. During the time Out B is used, the buffer from B to A is locked, and the buffer from A to B is unlocked.

It will be appreciated by those skilled in the art that although detection of two logical 1 bits triggers circuit 100 to disable the enabled buffer, as indicated in FIGS. 2 and 3, detection of three or more logical 1 bits may be used instead to trigger the disabling.

It will further be appreciated by those skilled in the art that circuit 100 may be used as a component of a more complex circuit that selectively connects terminal A with two terminals, B and C, or more than two terminals. To this end, reference is now made to FIG. 4, which is a simplified diagram of an electrical circuit 300 that determines bus direction in multiplexed directional SD and MMC signal lines, in accordance with an embodiment of the present invention. Generally, terminal A is connected to a host device, and terminals B and C are connected to slave devices.

Figure 4:
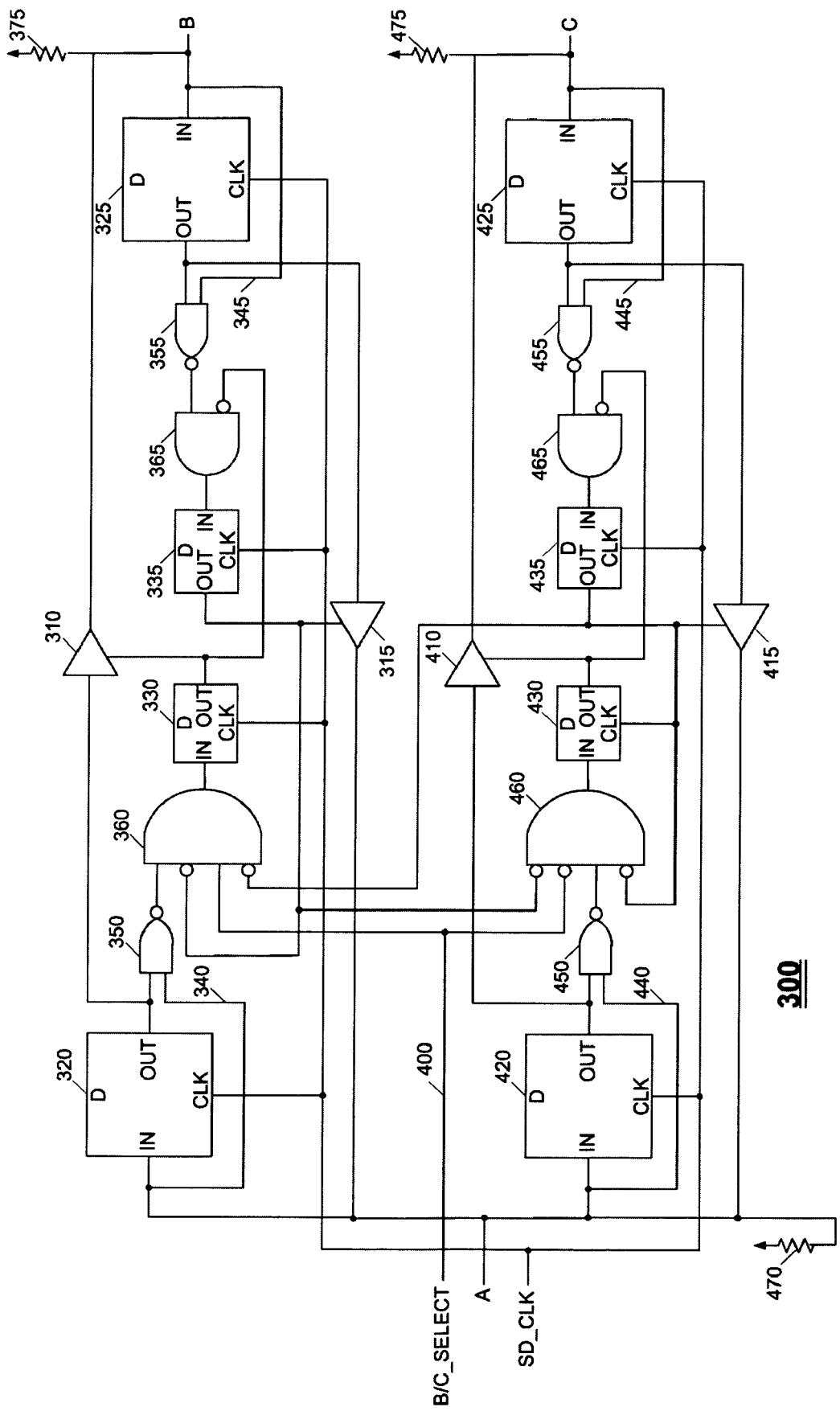
FIG. 4 is a simplified diagram of an electrical circuit that determines bus direction in multiplexed directional SD and MMC signal lines, in accordance with an embodiment of the present invention.

As shown in FIG. 4, circuit 300 includes two sub-circuits, each similar in operation to circuit 100. The elements of one of the sub-circuits are labeled with numerals 310-375, and the corresponding elements of the other sub-circuit are labeled with numerals 410-475. Each of the sub-circuits is bi-directional, with one direction enabled and the other direction disabled, at any moment.

Circuit 300 includes a B/C_SELECT signal line 400, for selecting terminal B or terminal C. B/C_SELECT line 400 originates from a controller for the host device connected to terminal A.

In distinction from logical processing unit 160 of circuit 100, logical processing units 360 and 460 have four input lines. For each logical processing unit, two of its input lines carry signals from the sub-circuit in which the processing unit is located, one signal for examining two previous bits in the enabled direction and the other signal for examining a bit in the disabled direction. One of its input lines carries a signal from the other sub-circuit, for examining a bit in the disabled direction; and one of its input lines carries a signal from B/C_SELECT line 400. Terminals A, B and C may have the same voltage levels, or different voltage levels. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for determining direction of signal transmission in a bi-directional signal line, comprising:
    sampling data signals at two terminals, A and B;
    enabling data flow from A to B when data flow from B to A is not enabled, and a logical 0 bit is sampled at A;
    enabling data flow from B to A when data flow from A to B is not enabled, and a logical 0 bit is sampled at B;
    disabling data flow from A to B when data flow from A to B is enabled and two successive logical 1 bits are sampled at A; and
    disabling data flow from B to A when data flow from B to A is enabled and two successive logical 1 bits are sampled at B.

2. The method of claim 1 further comprising sampling a clock subsequent to said enabling data flow from A to B, said enabling data flow from B to A, said disabling data flow from A to B, and said disabling data flow from B to A.

3. An electrical circuit with bi-directional signal transmission, comprising:
    a bi-directional data bus for connecting two terminals, A and B;
    a first signal sampler for sequentially sampling a signal at terminal A;
    a second signal sampler for sequentially sampling a signal at terminal B;
    a first level shifter for driving signals on said data bus from A to B, which may be enabled or disabled;
    a second level shifter for driving signals on said data bus from B to A, which may be enabled or disabled; and
    circuitry for enabling and disabling said first and second level shifters by carrying out instructions to:
        enable said first level shifter when said second level shifter is not enabled, and a logical 0 bit is sampled by said first signal sampler;
        enable said second level shifter when said first level shifter is not enabled, and a logical 0 bit is sampled by said second signal sampler;

disable said first level shifter when said first level shifter is enabled and two successive logical 1 bits are sampled by said first signal sampler; and disable said second level shifter when said second level shifter is enabled and two successive logical 1 bits are sampled by said second signal sampler.

4. The electrical circuit of claim 3 wherein said data bus is an SD data bus.

5. The electrical circuit of claim 4 wherein terminal A has the same voltage level as terminal B.

6. The electrical circuit of claim 4 wherein terminal A has a different voltage level than terminal B.

7. The electrical circuit of claim 3 wherein said data bus in an MMC data bus.

8. The electrical circuit of claim 3 further comprising a fixed directional clock data line, and wherein said circuitry samples a clock value after each instruction.

9. An electrical circuit with bi-directional signal transmission, comprising:
  a bi-directional data bus for connecting a terminal, A, with two terminals, B and C;
  a controller for selectively connecting terminal A with terminal B or with terminal C;
  a first signal sampler for sequentially sampling a signal at terminal A;
  a second signal sampler for sequentially sampling a signal at terminal B;
  a third signal sampler for sequentially sampling a signal at terminal C;
  a first level shifter for driving signals on said data bus from A to B, which may be enabled or disabled;
  a second level shifter for driving signals on said data bus from B to A, which may be enabled or disabled;
  a third level shifter for driving signals on said data bus from A to C, which may be enabled or disabled;
  a fourth level shifter for driving signals on said data bus from C to A, which may be enabled or disabled; and circuitry for enabling and disabling said first, second, third and fourth level shifters by carrying out instructions to:
    enable said first level shifter when (i) said controller selects terminal B, (ii) said second level shifter is not enabled, and (iii) a logical 0 bit is sampled by said first signal sampler;
    enable said second level shifter when (i) said controller selects terminal B, (ii) said first level shifter is not enabled, and (iii) a logical 0 bit is sampled by said second signal sampler;
    enable said third level shifter when (i) said controller selects terminal C, (ii) said fourth level shifter is not enabled, and (iii) a logical 0 bit is sampled by said third signal sampler;
    enable said fourth level shifter when (i) said controller selects terminal C, (ii) said third level shifter is not enabled, and (iii) a logical 0 bit is sampled by said fourth signal sampler;
    disable said first level shifter when said first level shifter is enabled and two successive logical 1 bits are sampled by said first signal sampler;
    disable said second level shifter when said second level shifter is enabled and two successive logical 1 bits are sampled by said second signal sampler;
    disable said third level shifter when said third level shifter is enabled and two successive logical 1 bits are sampled by said third signal sampler; and
  disable said fourth level shifter when said fourth level shifter is enabled and two successive logical 1 bits are sampled by said fourth signal sampler.

10. The electrical circuit of claim 9 wherein terminal B has the same voltage level as terminal C.

11. The electrical circuit of claim 9 wherein terminal B has a different voltage level than terminal C.

* * * * *